(12) United States Patent
Zhu et al.

(10) Patent No.: US 12,327,662 B1
(45) Date of Patent: Jun. 10, 2025

(54) INSULATED WIRE AND PREPARATION METHOD THEREOF, COIL, AND ELECTRONIC/ELECTRICAL EQUIPMENT

(71) Applicant: WELL ASCENT ELECTRONIC (GANZHOU) CO., LTD., Ganzhou (CN)

(72) Inventors: Yuejia Zhu, Ganzhou (CN); Zuomao Zhu, Ganzhou (CN); Huimin Ye, Ganzhou (CN)

(73) Assignee: WELL ASCENT ELECTRONIC (GANZHOU) CO., LTD., Ganzhou (CN)

( * ) Notice: Subject to any disclaimer, the term of this patent is extended or adjusted under 35 U.S.C. 154(b) by 0 days.

(21) Appl. No.: 19/016,555

(22) Filed: Jan. 10, 2025

(30) Foreign Application Priority Data

Jun. 28, 2024 (CN) .......................... 202410859701.4

(51) Int. Cl.
*H01B 7/02* (2006.01)
*H01B 3/30* (2006.01)
(Continued)

(52) U.S. Cl.
CPC ............... *H01B 7/02* (2013.01); *H01B 3/305* (2013.01); *H01B 3/306* (2013.01); *H01B 13/14* (2013.01); *H01F 5/06* (2013.01)

(58) Field of Classification Search
CPC .......... H01B 3/305; H01B 3/306; H01B 7/00; H01B 7/02; H01B 7/0208; H01B 7/0216; H01B 7/0275; C08G 73/10; C08G 73/1042; C08G 73/1046; C08G 73/105; C08G 73/1053; C08G 73/1067; C08G 73/1071; C08G 73/1075; C08G 73/1078; C08G 73/1082; C08G 73/1085; C08G 73/14

See application file for complete search history.

(56) References Cited

U.S. PATENT DOCUMENTS

2024/0052199 A1* 2/2024 Saito .................... C08G 73/105

FOREIGN PATENT DOCUMENTS

| CN | 103650066 A | 3/2014 |
|---|---|---|
| CN | 106489183 A | 3/2017 |

(Continued)

OTHER PUBLICATIONS

KR 2023-0106929 Machine Translation (Year: 2023).*

(Continued)

*Primary Examiner* — Zachary M Davis
(74) *Attorney, Agent, or Firm* — BCF LLP

(57) ABSTRACT

The present disclosure discloses an insulated wire and a preparation method thereof, a coil, and an electronic/electrical equipment, relating to the technical field of wire and cable production. The insulated wire includes a conductor, with an intermediate layer and an insulating layer sequentially coated on the conductor; the intermediate layer includes polyamide-imide and polyimide; and the insulating layer includes a specific proportion of TPI and corona-resistant material. By optimizing the composition of the intermediate layer and the insulating layer, the insulating layer of the present disclosure not only has good corona resistance performance but also possesses high adhesion strength, thus reducing the likelihood of breakdown in the insulated wire.

17 Claims, 1 Drawing Sheet

(51) Int. Cl.
*H01B 13/14* (2006.01)
*H01F 5/06* (2006.01)

(56) References Cited

FOREIGN PATENT DOCUMENTS

| | | |
|---|---|---|
| CN | 114664484 A | 6/2022 |
| JP | H07205255 A | 8/1995 |
| JP | H09109230 A | 4/1997 |
| KR | 20230106929 A | 7/2023 |

OTHER PUBLICATIONS

Notification to Grant with regard to the CN Patent Application No. CN 2024108597014 issued Aug. 27, 2024.
Office Action with regard to the CN Patent Application No. CN 2024108597014 dated Jul. 29, 2024.

\* cited by examiner

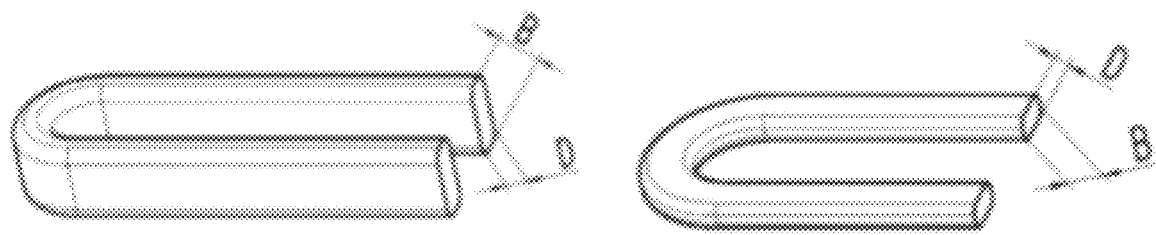

INSULATED WIRE AND PREPARATION METHOD THEREOF, COIL, AND ELECTRONIC/ELECTRICAL EQUIPMENT

CROSS-REFERENCE TO RELATED APPLICATION

The present disclosure claims priority to Chinese patent Application No. 2024108597014, filed with the Chinese Patent Office on Jun. 28, 2024, entitled "INSULATED WIRE AND PREPARATION METHOD THEREOF, COIL, AND ELECTRONIC/ELECTRICAL EQUIPMENT", the entire contents of which are incorporated herein by reference.

TECHNICAL FIELD

The present disclosure relates to the technical field of wire and cable production, and specifically, to an insulated wire and a preparation method thereof, a coil, and an electronic/electrical equipment.

BACKGROUND ART

An insulated wire refers to a wire with an insulating layer coated on a conductor. The insulated wires have been widely applied in the coils of various electronic/electrical devices. Coils are commonly configured to drive motors, generators, transformers, etc., and are required to withstand high-frequency and high-voltage impacts. They are sometimes used in working environments with localized electric field strengths that are very high. Since insulated wires may continuously undergo high-frequency voltage impacts during operation, when the local electric field strength reaches a certain value, local ionization discharge may occur, with blue fluorescence appearing at the ionized location, i.e., the corona phenomenon. The occurrence of the corona phenomenon is accompanied by thermal effects, which cause local temperature rise in the coil winding, leading to thermal melting or thermal decomposition and deterioration. This, in turn, results in insulation aging and short-circuit phenomena, affecting the service life of electronic/electrical devices.

To improve the corona resistance of insulated wires, a common method is to coat the conductor with a corona-resistant insulating layer. The materials used for corona resistance are mainly inorganic nanomaterials. However, the addition of inorganic nanomaterials significantly reduces the adhesion of the insulating layer, which may lead to phenomena such as cracking and detachment, causing the loss of insulating properties of the wire and the easy occurrence of breakdown in the insulated wire.

In addition, thermoplastic polyimide (TPI) is itself a very good insulating layer material. However, due to the easy decomposition and generation of bubbles during the extrusion process, the breakdown voltage of the insulating layer is reduced, which in turn affects the service life of the insulated wire.

Therefore, improving the breakdown resistance of the TPI insulating layer while ensuring corona resistance is a technical problem that needs to be solved urgently.

In view of this, the present disclosure is provided.

SUMMARY

The objective of the present disclosure is to provide an insulated wire and a preparation method thereof, a coil, and an electronic/electrical equipment, aiming to improve the adhesion of the TPI insulating layer and thereby improve the breakdown resistance, under the premise of ensuring corona resistance.

The present disclosure is implemented as follows.

In a first aspect, the present disclosure provides an insulated wire, including a conductor, and on the conductor, an intermediate layer and an insulating layer are sequentially coated,
 wherein the intermediate layer includes polyamide-imide and polyimide, and a mass ratio of polyamide-imide to polyimide in the intermediate layer is (8-30): 1;
 the insulating layer includes thermoplastic polyimide and corona-resistant materials, and a mass percentage of the corona-resistant material in the insulating layer is 6%-10%; and
 a thickness ratio of the intermediate layer to the insulating layer is 1:(13-18).

In an optional embodiment, when the insulating layer is stretched at a rate of 300 mm/min by 20%, a length at which the insulating layer loses adhesion is no more than 1 times a width of the conductor.

In an optional embodiment, a corona onset voltage of the insulating layer is above 1500V, and a corona resistance time is above 200 hours.

In an optional embodiment, the corona-resistant material is selected from at least one of titanium dioxide, silicon dioxide, and aluminum oxide; and a particle size of the corona-resistant material is 10 nm-30 nm.

In an optional embodiment, a thickness of the intermediate layer is 5 μm-30 μm, and a thickness of the insulating layer is 50 μm-300 μm.

In an optional embodiment, the material of the conductor is selected from at least one of copper, copper alloy, aluminum, and aluminum alloy.

In a second aspect, the present disclosure provides a preparation method of the insulated wire as described in any of the preceding embodiments, including forming the intermediate layer and the insulating layer sequentially on the conductor, wherein the intermediate layer contains polyamide-imide and polyimide, the insulating layer contains thermoplastic polyimide and corona-resistant materials, and the mass percentage of the corona-resistant material in the insulating layer is 6%-10%.

In an optional embodiment, the intermediate layer is formed by multiple times of coating and curing to obtain a core material, and the thermoplastic polyimide and the corona-resistant material are mixed and then molten and extruded onto the outer side of the core material to form the insulating layer.

In an optional embodiment, the preparation process of the insulating layer includes: mixing the thermoplastic polyimide and the corona-resistant material to obtain an insulating layer mixture, and then melting and extruding the insulating layer mixture under a negative pressure condition and at a temperature of 370° C.-410° C., with controlling a vacuum suction used to apply the negative pressure to be greater than or equal to 0.3 MPa.

In an optional embodiment, the extruder is vacuumed for 60 min to 120 min before adding the insulating layer mixture into the extruder.

In an optional embodiment, after extrusion, the temperature is maintained at 280° C.-320° C. for 12 s-20 s, then cooled.

In an optional embodiment, the preparation process of the insulating layer mixture includes: drying the thermoplastic polyimide and the corona-resistant material separately, and then mixing them in an inert atmosphere, wherein the drying temperature is controlled to be 180° C.-220° C., and the drying time is controlled to be 4 h-6 h.

In an optional embodiment, before the melting and extruding, the core material is preheated to 200° C.-320° C.

In an optional embodiment, the preparation process of the core material includes: mixing polyamide-imide, polyimide, and an organic solvent to obtain an intermediate layer mixture, and coating and curing the intermediate layer on the conductor multiple times.

In an optional embodiment, during the preparation of the intermediate layer mixture, the mass ratio of polyamide-imide to polyimide is controlled to be (8-30): 1.

In an optional embodiment, an amount of organic solvent is adjusted to make a solid content of the intermediate layer mixture be 20%-25%.

In an optional embodiment, a thickness of each time of coating is controlled to be 2 µm-3 µm, and the number of times of coating is controlled to be 3-10.

In an optional embodiment, the curing temperature is controlled to be 250° C.-450° C. each time.

In a third aspect, the present disclosure provides a coil, including an insulated wire from any of the preceding embodiments or an insulated wire prepared by the preparation method of any of the preceding embodiments.

In a fourth aspect, the present disclosure provides an electronic/electrical equipment, including a coil as described in the preceding embodiment.

The present disclosure has the following beneficial effects. The present disclosure optimizes the composition of the intermediate layer and the insulating layer, and introduces corona-resistant materials into the insulating layer, significantly improving the corona resistance of the insulating layer; by optimizing the composition of the intermediate layer and using polyamide-imide and polyimide as the raw materials for the intermediate layer, the adhesion between the intermediate layer and the insulating layer can be significantly enhanced. The insulating layer in the insulated wire provided by the present disclosure not only has good corona resistance but also possesses high adhesive strength, making it less likely for the insulated wire to experience breakdown.

Generally, when a corona-resistant insulating coating is applied to the conductor, the introduction of corona-resistant materials tends to reduce the adhesion of the insulating coating, causing the insulating layer to lose its adhesion, which in turn leads to the problem of the insulated wire being broken down. The present disclosure addresses the issue of TPI, a special insulating layer material, which is prone to decomposing and generating bubbles when an extrusion process is adopted for preparing the insulating layer and also lowers the breakdown voltage of the insulating layer. The applicants have optimized the composition of the intermediate layer and the insulating layer, particularly the amount of corona-resistant materials and the composition of the intermediate layer, which significantly increases the adhesion of the insulating layer and reduces the likelihood of breakdown in the insulated wire. By optimizing the extrusion process, the raw materials can be smoothly extruded while minimizing bubble generation, thus allowing the insulating layer to have a higher breakdown voltage.

BRIEF DESCRIPTION OF DRAWINGS

To more clearly illustrate the technical solutions of the embodiments of the present disclosure, the following will briefly introduce the drawings used in the embodiments. It should be understood that the following drawings only show some embodiments of the present disclosure, and therefore they should not be regarded as a limitation on the scope. Those ordinary skilled in the art can also obtain other related drawings based on these drawings without inventive effort.

FIG. 1 is a schematic diagram of a testing method for a bending processability test in the present disclosure.

DETAILED DESCRIPTION OF EMBODIMENTS

To provide a clearer understanding of the objective, technical solution, and advantages of the embodiments of the present disclosure, the technical solution in the embodiments of the present disclosure will be described in a clear and comprehensive manner. Unless specified under particular conditions in the embodiments, standard conditions or conditions recommended by the manufacturer are used. Reagents or instruments not specified by a manufacturer are conventional products that can be commercially obtained.

The embodiment of the present disclosure provides a preparation method of an insulated wire, including the following steps.

S1. Material Preparation:
  preparing the conductor, wherein the conductor can be a commonly used conductor for insulated wires, with no specific limitation on the material or shape of the conductor, wherein
  in some embodiments, the material of the conductor is selected from at least one of copper, copper alloy, aluminum, and aluminum alloy. The material of the conductor can be any one or combination of these materials, preferably, copper, and commercially available copper wire can be used; and
  in some embodiments, the section of the conductor is rectangular, and the size of the conductor is not limited, but can be adjusted according to the specific application environment;
  preparing the intermediate layer raw materials, such as polyamide-imide, polyimide, and organic solvents, wherein the raw materials above are commercially available; and
  preparing the insulating layer raw materials, i.e., TPI and corona-resistant materials, wherein the corona-resistant material is selected from at least one of titanium dioxide, silicon dioxide, and aluminum oxide. The corona-resistant material can be any one or combination of these materials, the particle size of the corona-resistant material is 10 nm-30 nm (e.g., 10 nm, 15 nm, 20 nm, 25 nm, and 30 nm); and a smaller particle size helps improve the uniformity of distribution of the corona-resistant material and enhances the corona resistance.

S2. Forming the Intermediate Layer:
  forming the intermediate layer on the conductor to obtain a core material, where the intermediate layer helps improve the bonding strength between the conductor and the insulating layer and reduce the occurrence of insulating layer detachment.

It should be noted that, because that the main material of the insulating layer is TPI, which tends to generate many bubbles after extrusion through the extrusion process, leading to the easy breakdown of the insulating layer, and that the corona-resistant materials are introduced in the insulating layer, the requirements for the intermediate layer are further raised.

The applicants inventively use polyamide-imide and polyimide as the materials for the intermediate layer, which can improve the adhesion of the insulating layer containing corona-resistant materials. The preparation process of the core material includes: mixing polyamide-imide, polyimide, and an organic solvent to obtain an intermediate layer mixture, and coating and curing the intermediate layer mixture on the conductor multiple times. After each time of coating, curing is performed, and after multiple times of coating and curing, an intermediate layer with the required thickness is obtained. During the preparation of the intermediate layer mixture, the mass ratio of polyamide-imide to polyimide is controlled to be (8-30): 1, such as 8:1, 10:1, 15:1, 20:1, 25:1, and 30:1.

In some embodiments, the amount of organic solvent is controlled so that the solid content of the intermediate layer mixture is 20%-25%, such as 20%, 21%, 22%, 23%, 24%, and 25%. The solid content range allows for even coating of the raw materials and case of curing and shaping. After curing, the organic solvent is removed, and the solvent content is typically less than 200 ppm after curing. The solid content of the intermediate layer mixed liquor at 20° C. is 20%-25%, and a viscosity is 5000 cp-6000 cp. By adjusting the amounts of the components, the bonding strength between the intermediate layer and the insulating layer can be further improved, thus preventing phenomena such as cracking or detachment of the insulated wire.

In some embodiments, the thickness for each time of coating is controlled to be 2 μm-3 μm, and the coating is applied 3 to 10 times. The temperature for each time of curing is controlled to be 250° C.-450° C. A baking furnace can be used for heating and curing, with a line speed of approximately 9 m/min. The length of the baking furnace is approximately 12 m, and the line speed will be adjusted according to the size of the conductor. By precisely controlling the thickness of each time of coating and the number of times of coating, the material can be fully cured to form a uniform intermediate layer.

Specifically, during the formation of the intermediate layer, an intermediate layer mixed liquor is first coated onto the conductor, followed by heating and curing. Then, another layer of the intermediate layer mixed liquor is coated, followed by heating and curing. The process is repeated until the thickness of the intermediate layer meets the required specifications. The thickness for each times of coating can be 2.0 μm, 2.3 μm, 2.5 μm, 2.8 μm, 3.0 μm, etc., and the coating can be applied 3, 4, 5, 6, 7, 8, 9, 10 times, etc. After coating, the temperature for each time of curing can be 250° C., 300° C., 350° C., 400° C., 450° C., etc.

In some embodiments, after multiple times of coating and curing, the total thickness of the intermediate layer is controlled to be 5 μm-30 μm (e.g., 5 μm, 10 μm, 15 μm, 20 μm, 25 μm, and 30 μm) to ensure the adhesion strength between the insulating layer and the conductor and to reduce the occurrence of breakdown of the insulated wire.

The type of organic solvent is not limited, as long as it can effectively dissolve polyamide-imide, polyimide. It can specifically be at least one of amide-based solvents, urea-based solvents, lactone-based solvents, carbonate-based solvents, ketone-based solvents, ester-based solvents, glycol dimethyl ether-based solvents, hydrocarbon-based solvents, phenol-based solvents, and sulfone-based solvents.

Specifically, amide-based solvents can include N,N-dimethylacetamide (DMAC), N,N-dimethylformamide (DMF), etc.; urea-based solvents can include N,N-dimethylvinylurca, N,N-dimethylpropyleneurea, tetramethylurca, etc.; lactone-based solvents can include γ-butyrolactone, γ-caprolactone, etc.; carbonate-based solvents can include propylene carbonate, but are not limited to this; ketone-based solvents can include methyl ethyl ketone, methyl isobutyl ketone, cyclohexanone, etc.; ester-based solvents can include ethyl acetate, n-butyl acetate, butyl cellosolve acetate, butyl carbitol acetate, ethyl cellosolve acetate, ethyl carbitol acetate, etc.; glycol dimethyl ether-based solvents can include diglycol dimethyl ether, triglycol dimethyl ether, tetraglycol dimethyl ether, etc.; hydrocarbon-based solvents can include toluene, xylene, cyclohexane, etc.; phenol-based solvents can include methylphenol, phenol, halogenated phenol, etc.; and sulfone-based solvents can include cyclobutyl sulfone, dimethyl sulfone (DMSO), etc.

In some embodiments, corona-resistant materials can also be introduced into the intermediate layer, where the particle size of the nano corona-resistant materials is 10-100 nm, and the addition amount is 1-5% (by mass fraction). By applying multiple times of coating, the distribution of the corona-resistant material becomes more uniform, and the corona resistance effect improves.

S3. Forming the Corona-Resistant Insulating Layer
melting and extruding the raw materials for the corona-resistant insulating layer onto the outer side of the core material obtained in S2 to form the corona-resistant insulating layer;
compared to the process with multiple times of coating, the method is easier to operate and can significantly shorten the production cycle.

In some embodiments, the insulating layer is formed by TPI and corona-resistant materials, where the mass ratio of the corona-resistant material in the insulating layer is 6%-10%, for example, 6%, 7%, 8%, 9%, and 10%. By further optimizing the amount of corona-resistant material, the insulating layer can achieve better corona resistance performance and also reduce to a certain extent the problem of decreased adhesion of the insulating layer caused by the introduction of corona-resistant materials.

Conventional extrusion processes tend to cause larger and more numerous bubbles in the TPI insulating layer, thus affecting the breakdown resistance of the insulating layer. The applicants have optimized the extrusion process so that the resulting TPI insulating layer has fewer and smaller bubbles. The extrusion process is as follows: first, preheating the core material to 200° C.-320° C.; after the extruder is evacuated, adding the insulating layer mixture, which is obtained by mixing TPI and corona-resistant materials, to the extruder; melting and extruding the insulating layer mixture under negative pressure conditions and at a temperature of 370° C.-410° C., with controlling a vacuum suction used to apply the negative pressure to be greater than or equal to 0.3 MPa; and continuously vacuuming the extruder barrel region where the extruder screw works by using a device capable of applying the negative pressure to be greater than or equal to 0.3 MPa.

Preheating the core material can soften the intermediate layer, and controlling the preheating temperature within the specified range can enhance the adhesion effect with the insulating layer. By first evacuating the extruder, oxygen is reduced from contacting the material, the negative pressure can be provided, and the gases can be quickly expelled. Optimizing the range of negative pressure can ensure that TPI can be smoothly extruded and significantly reduces the bubble content in the insulating layer. If the applied negative pressure is too high, TPI cannot be smoothly extruded. If the applied negative pressure is too low, gases cannot be expelled quickly, thereby increasing the bubble content in the insulating layer.

Specifically, the preheating temperature of the core material can be 200° C., 220° C., 240° C., 260° C., 280° C., 300° C., 320° C., etc. The method of preheating the core material is not limited, and can include using a high-frequency induction heating method in an inert gas atmosphere to preheating the core material. The high-frequency induction heating method can quickly bring the core material to the required temperature, shortening the process time. Specifically, the inert gas can be nitrogen, argon, etc., but is not limited to these. The temperature for melting and extruding can be 370° C., 380° C., 390° C., 400° C., 410° C., etc.

In some embodiments, the preparation process of the insulating layer mixture includes: drying TPI and corona-resistant materials separately, then mixing and stirring them under an inert atmosphere for 60 min to 90 min to ensure uniform mixing of TPI and corona-resistant materials. During the mixing process, oxygen is avoided.

Specifically, TPI and corona-resistant materials can be dried separately using a vacuum drying oven to reduce the water content in the raw materials, which is conducive to further reducing the generation of bubbles in subsequent processes. The mixing and stirring process can be performed in a high-speed mixer, and the obtained insulating layer mixture can enter the extruder under scaled conditions. The particle size of the TPI particles used is approximately 1 mm to 3 mm, such as 1 mm, 2 mm, and 3 mm. The drying temperature is controlled at 180° C.-220° C., and the drying time is 4 h to 6 h. By regulating the drying temperature and time, the performance of the insulating layer can be further improved. Specifically, the drying temperature can be 180° C., 190° C., 200° C., 210° C., 220° C., etc., and the drying time can be 4 h, 5 h, 6 h, etc.

In some embodiments, firstly, the extruder is evacuated for 60 min to 120 min, and then the insulating layer mixture is added to the extruder. Further controlling the vacuum time can more fully expel the gases inside the extruder, prevent oxygen interference during the extrusion process, and further prevent material carbonization and thermal acid degradation. Specifically, the vacuum time of the extruder can be 60 min, 70 min, 80 min, 90 min, 100 min, 110 min, 120 min, etc.

In some embodiments, after melting and extruding, the insulated wire is maintained at 280° C.-320° C. for 12 s to 20 s, and then cooled to obtain the insulated wire product. Specifically, the post-extrusion holding temperature can be 280° C., 290° C., 300° C., 310° C., 320° C., etc., and the holding time can be 12 s, 15 s, 18 s, 20 s, etc.

In some embodiments, the thickness of the insulation layer is adjusted by regulating the amount of insulating layer mixture. The thickness ratio of the intermediate layer to the insulating layer is 1:(13-18), and the thickness of the insulating layer is 50 μm-300 μm. By further controlling the thickness ratio and specific thickness of the intermediate layer and insulating layer, the corona resistance performance of the insulated wire can be improved, and the adhesion can also be ideal. Specifically, the thickness ratio of the intermediate layer to the insulating layer can be 1:13, 1:14, 1:15, 1:16, 1:17, 1:18, etc., and the thickness of the insulating layer can be 50 μm, 100 μm, 150 μm, 200 μm, 250 μm, 300 μm, etc.

The embodiments of the present disclosure also provide an insulated wire, including a conductor, with an intermediate layer and an insulating layer sequentially coated on the conductor. The intermediate layer includes polyamide-imide and polyimide. The insulating layer includes TPI and corona-resistant materials, where the mass ratio of the corona-resistant materials in the insulating layer is 6%-10%.

It should be noted that, in the embodiments of the present disclosure, by optimizing the composition of the intermediate layer and the insulating layer, the insulating layer not only has good corona resistance performance but also possesses high adhesion strength, thus reducing the likelihood of breakdown in the insulated wire. The insulated wire provided in the embodiments of the present disclosure can be applied in a 900V high-voltage platform. The high-voltage platform requires Type II insulation and corona resistance.

When the insulating layer is stretched at a rate of 300 mm/min by 20%, a length at which the insulating layer loses adhesion is no more than 1 times a width of the conductor. The corona onset voltage of the insulating layer is above 1500V, and the corona resistance time is above 200 h. The insulating layer has good adhesion and good corona resistance performance.

The embodiments of the present disclosure also provide a coil, which includes the above-mentioned insulated wire. The insulated wire provided in the embodiments of the present disclosure enables the coil to have better corona resistance performance and the insulating layer to have better adhesion, thus improving the service life of the coil.

The embodiments of the present disclosure provide an electronic/electrical equipment, including the above-mentioned coil. The specific type of electronic equipment or electrical equipment is not limited and can include drive motors, electric motors, transformers, etc.

The following provides a more detailed description of the features and performance of the present disclosure in conjunction with the examples.

It should be noted that the conductor is low-oxygen copper or oxygen-free copper. In both the examples and the comparative example, the copper size is 2 mm×3 mm.

Example 1

The example provides a preparation method of an insulated wire, including the following steps.
(1) Material Preparation:
  providing a copper conductor, cleaning and drying the copper wire for subsequent use;
  providing polyamide-imide for the intermediate layer, where PAI is an amorphous resin with a glass transition temperature between 200° C. and 300° C. and an elastic modulus of 300 MPa to 800 MPa;
  providing polyimide for the intermediate layer, with a particle size of 15 μm to 30 μm and a glass transition temperature of 315° C.;
  providing an organic solvent: N, N-dimethylformamide (DMF);
  providing TPI for the insulating layer, with a particle size of 2 mm, a glass transition temperature of 243° C., and a melting point of 388° C.; vacuum drying thermoplastic polyimide particles at 200° C. for 5 h for subsequent use; and
  providing a corona-resistant material, and vacuum drying titanium dioxide at 200° C. for 5 h for subsequent use.
(2) Forming the Intermediate Layer:
  mixing polyamide-imide, polyimide, and organic solvent to obtain an intermediate layer mixture, where the solid content of the intermediate layer mixture was 22%, and the mass ratio of polyamide-imide to polyimide was 15:1; and
  forming the intermediate layer on the copper wire by coating and curing the intermediate layer mixed liquor four times, where the curing temperature after coating was 350° C.; controlling the solvent content after each time of curing to be less than 200 ppm; and after the fourth curing, forming an intermediate layer with a thickness of 12 μm to obtain a core material.

(3) Forming the Corona-Resistant Insulating Layer:
  after drying TPI and the corona-resistant material separately in a vacuum drying oven, mixing and stirring them under a nitrogen atmosphere for 60 min to obtain an insulating layer mixture, wherein the mass ratio of TPI to the corona-resistant material was 92:8;
  using high-frequency induction heating to preheat the core material obtained in step (2); controlling the heating power at 5000 W, frequency at 96 kHz, and preheating temperature at 290° C.; placing the preheated core material into an extruder; vacuuming the extruder for 1.5 h, then adding the insulating layer mixture to the extruder under sealed condition; melting and extruding the insulating layer mixture under a negative pressure condition and a temperature of 380° C.; controlling a vacuum suction used to apply the negative pressure to be equal to 0.3 MPa; and after extrusion, maintaining the temperature at 280° C. for 15 s, where, in the insulated wire obtained, the total thickness of the coating film of the insulated wire was 145 μm.

Example 2

The example provides a preparation method of an insulated wire, including the following steps.
(1) Material Preparation:
  providing TPI for the insulating layer, with a particle size of 1 mm, where other conditions refer to Example 1.
(2) Forming the Intermediate Layer:
  mixing polyamide-imide, polyimide, and organic solvent to obtain an intermediate layer mixture, where the solid content of the intermediate layer mixture was 20%, and the mass ratio of polyamide-imide to polyimide was 8:1; and
  forming the intermediate layer on the copper wire by coating and curing the intermediate layer mixed liquor four times, where the curing temperature after coating was 430° C.; controlling the solvent content after each time of curing to be less than 200 ppm; and after the fourth curing, forming an intermediate layer with a thickness of 8 μm to obtain a core material.
(3) Forming the Corona-Resistant Insulating Layer:
  after drying TPI and the corona-resistant material separately in a vacuum drying oven, mixing and stirring them under a nitrogen atmosphere for 60 min to obtain an insulating layer mixture, wherein the mass ratio of TPI to the corona-resistant material was 94:6; and
  using high-frequency induction heating to preheat the core material obtained in step (2); controlling the heating power at 5000 W, frequency at 96 kHz, and preheating temperature at 200° C.; placing the preheated core material into an extruder; vacuuming the extruder for 1 h, then adding the insulating layer mixture to the extruder under sealed condition; melting and extruding the insulating layer mixture under a negative pressure condition and a temperature of 390° C.; controlling a vacuum suction used to apply the negative pressure to be equal to 0.4 MPa; and after extrusion, maintaining the temperature at 180° C. for 12 s, where in the insulated wire obtained, the total thickness of the coating film of the insulated wire was 145 μm.

Example 3

The example provides a preparation method of an insulated wire, including the following steps.
(1) Material Preparation:
  providing TPI for the insulating layer, with a particle size of 3 mm, where other conditions refer to Example 1.
(2) Forming the Intermediate Layer:
  mixing polyamide-imide, polyimide, and organic solvent to obtain an intermediate layer mixture, where the solid content of the intermediate layer mixture is 25%, and the mass ratio of polyamide-imide to polyimide is 30:1; and
  forming the intermediate layer on the copper wire by coating and curing the intermediate layer mixed liquor four times, where the curing temperature after coating was 300° C.; controlling the solvent content after each time of curing to be less than 200 ppm; and after the fourth curing, forming an intermediate layer with a thickness of 10 μm to obtain a core material.
(3) Forming the Corona-Resistant Insulating Layer:
  after drying TPI and the corona-resistant material separately in a vacuum drying oven, mixing and stirring them under a nitrogen atmosphere for 60 min to obtain an insulating layer mixture, wherein the mass ratio of TPI to the corona-resistant material was 90:10; and
  using high-frequency induction heating to preheat the core material obtained in step (2); controlling the heating power at 5000 W, frequency at 96 kHz, and preheating temperature at 320° C.; placing the preheated core material into an extruder; vacuuming the extruder for 2 h, then adding the insulating layer mixture to the extruder under sealed condition; melting and extruding the insulating layer mixture under a negative pressure condition and a temperature of 410° C.; controlling a vacuum suction used to apply the negative pressure to be equal to 0.5 MPa; and after extrusion, maintaining the temperature at 320° C. for 12 s, where in the insulated wire obtained, the total thickness of the coating film of the insulated wire was 145 μm.

The present disclosure also tested the following single-variable comparison cases.

Example 4

The only difference from Example 1 is that, in step (3), the mass ratio of TPI to corona-resistant material was 94:6.

Example 5

The only difference from Example 1 is that, in step (3), the mass ratio of TPI to corona-resistant material was 90:10.

Example 6

The only difference from Example 1 is that the corona-resistant material was silicon dioxide.

Example 7

The only difference from Example 1 is that the corona-resistant material was aluminum oxide.

Example 8

The only difference from Example 1 is that, in step (3), the vacuum suction applied for negative pressure was controlled to be equal to 0.4 MPa.

Example 9

The only difference from Example 1 is that, in step (3), the vacuum suction applied for negative pressure was controlled to be equal to 0.5 MPa.

Comparative Example 1

The only difference from Example 1 is that, in step (3), no corona-resistant material was added.

Comparative Example 2

The only difference from Example 1 is that, in step (3), the mass ratio of TPI to corona-resistant material was 95:5.

Comparative Example 3

The only difference from Example 1 is that, in step (3), the mass ratio of TPI to corona-resistant material was 88:12.

Comparative Example 4

The only difference from Example 1 is that the extrusion process was changed, where the existing extrusion process was adopted without vacuuming or negative pressure operations, and extrusion was performed in an air atmosphere.

Comparative Example 5

The only difference from Example 1 is that the extrusion process was changed, and extrusion was performed in a nitrogen atmosphere without vacuuming or negative pressure operations.

Comparative Example 6

The only difference from Example 1 is that, in step (3), the vacuum suction applied for negative pressure was controlled to be equal to 0.2 MPa.

Comparative Example 7

The only difference from Example 1 is that, in step (3), the vacuum suction applied for negative pressure was controlled to be equal to 0.1 MPa.

Comparative Example 8

The only difference from Example 1 is that, in step (3), the preheating temperature was 180° C.

Comparative Example 9

The only difference from Example 1 is that, in step (3), the preheating temperature was 400° C.

Comparative Example 10

The only difference from Example 1 is that the thickness of the intermediate layer was 5 µm, the thickness of the insulating layer was 140 µm, and the total thickness of the coating film of the insulated wire was 145 µm.

Comparative Example 11

The only difference from Example 1 is that the thickness of the intermediate layer was 30 µm, the thickness of the insulating layer was 110 µm, and the total thickness of the coating film of the insulated wire was 145 µm.

Comparative Example 12

The only difference from Example 1 is that, in step (2), the intermediate layer mixture was prepared with different amounts of each component. Specifically, the step included: mixing polyamide-imide, polyimide, and organic solvent to obtain an intermediate layer mixture, where the solid content of the intermediate layer mixture was 22%, and the mass ratio of polyamide-imide to polyimide was 5:1.

Comparative Example 13

The only difference from Example 1 is that, in step (2), the intermediate layer mixture was prepared with different amounts of each component. Specifically, the step included: mixing polyamide-imide, polyimide, and organic solvent to obtain an intermediate layer mixture, where the solid content of the intermediate layer mixture was 22%, and the mass ratio of polyamide-imide to polyimide was 35:1.

Experimental Example 1

The properties of the insulated wires obtained from the examples and the comparative examples were tested and the results are shown in Table 1.

Test Methods are as Follows.

(1) Insulation Breakdown Voltage Test

The test was conducted according to the breakdown voltage test method provided in IEC60851-5 2019 test method 13. Specific steps included: removing the insulation from one end of the insulated wire, bending the wide side of the insulated wire on a cylindrical rod with a diameter of q 25 mm, and placing it into a metal steel ball container with a thickness of at least 5 mm, wherein the end of the sample should extend a sufficient length to avoid flashover; applying the test voltage between the conductor and the metal steel ball; boosting the voltage at a rate of 500 V/s with a leakage current of 5 mA; and testing five times and using the average value as the evaluation value of insulation breakdown voltage.

(2) Corona Resistance Time Test

The test was conducted according to test method GB/T4074.21. The specific steps included: placing the insulated wire in a high-frequency pulse voltage testing apparatus, applying high-frequency pulse voltage between the two conductors of the sample under the following conditions, and recording the testing results.

The test conditions included a pulse frequency of 20 kHz, a pulse duty cycle of 50%, a pulsed square wave, a bipolar pulse, a test voltage of 1.5 kV, a temperature of 155° C., and a rise time of 100 ns; and the evaluation criteria are:

A+, over 500 hours;
A, above 200 hours and below 500 hours;
B: less than 200 hours.

(3) Adhesion Test

The test was conducted according to the adhesion test method provided in IEC-60851-3 2019 test method 8. Specific steps included:

taking 300 mm of the insulated wire obtained from the examples and comparative examples as samples; placing the sample between two clamps, where the sample is placed on the same axis as the clamp and is clamped at both ends; stretching the sample at a rate of 300 mm/min by 20%; and inspecting the length of the coating film of the samples that loses adhesion.

(4) Flexibility Test

The flexibility test was performed on the insulated wires of the examples and comparative examples according to the following method.

The flexibility test was conducted according to the method provided in IEC60851-3 2019 test method 8. Specific steps included:

as shown in FIG. 1, taking two insulated wires of 500 mm in length, and winding each insulated wire around a polished test shaft by 180+2°, where one wire is wound flatly (shaft diameter=twice the wire thickness), and the other is wound uprightly (shaft diameter=twice the wire width). In FIG. 1, "B" and "D" represent the wire width and wire thickness of the insulated wire, respectively. In this test, after flat winding and upright winding, products without cracks on the surface are rated as "Pass"; products with cracks on the surface are rated as "Fail".

(5) Bubble On-Line Detection

The test was conducted using an online visual detection device, which conducts online bubble detection on the insulated wire. The test method can adopt the visual detection technology in the prior art or adopt the method disclosed in the patent application with No. CN202310025492.9.

TABLE 1

Properties of insulated wires obtained from the examples and the comparative examples

| Group | Corona resistance performance | Loss of adhesion (mm) | Breakdown voltage (KV) | Flexibility test | Number of bubbles (pcs/100m) | Maximum diameter Dmax (μm) |
| --- | --- | --- | --- | --- | --- | --- |
| Example 1 | A | 1.58 | 17.2 | Pass | 1 | 32 |
| Example 2 | A | 1.72 | 17.9 | Pass | 0 | 29 |
| Example 3 | A | 1.76 | 17.5 | Pass | 1 | 33 |
| Example 4 | A | 1.65 | 17.2 | Pass | 1 | 34 |
| Example 5 | A+ | 1.61 | 17.1 | Pass | 0 | 26 |
| Example 6 | A | 1.59 | 17.3 | Pass | 1 | 36 |
| Example 7 | A | 1.63 | 17.5 | Pass | 1 | 38 |
| Example 8 | A | 1.58 | 17.8 | Pass | 0 | 28 |
| Example 9 | A | 1.55 | 17.9 | Pass | 0 | 26 |
| Comparative Example 1 | B | 1.75 | 17.3 | Pass | 1 | 39 |
| Comparative Example 2 | A | 1.68 | 17.8 | Pass | 1 | 31 |
| Comparative Example 3 | A | 1.73 | 17.9 | Pass | 1 | 34 |
| Comparative Example 4 | A | 2.51 | 10.3 | Fail | Several | 126 |
| Comparative Example 5 | A | 2.63 | 10.9 | Fail | Several | 135 |
| Comparative Example 6 | A | 1.63 | 13.1 | Pass | Several | 95 |
| Comparative Example 7 | B | 1.69 | 10.3 | Pass | Several | 127 |
| Comparative Example 8 | A | 4.37 | 17.1 | Fail | 0 | 27 |
| Comparative Example 9 | A | 2.89 | 11.3 | Fail | Several | 45 |
| Comparative Example 10 | A+ | 4.22 | 17.9 | Fail | 1 | 38 |
| Comparative Example 11 | B | 1.32 | 16.5 | Pass | 1 | 39 |
| Comparative Example 12 | A | 4.32 | 17.4 | Fail | 1 | 36 |
| Comparative Example 13 | A | 6.23 | 17.3 | Fail | 1 | 35 |

Note: in Table 1, "several" refers to the number of bubbles greater than or equal to 50.

From Table 1, it can be observed that the insulated wires prepared in the examples of the present disclosure have both good corona resistance performance and good adhesion.

In the comparative examples 1-3, the corona-resistant materials were not added or the amount of the corona-resistant materials was too large or too small, which cannot simultaneously balance corona-resistant performance and adhesion.

The comparative examples 4-7 are the cases where the extrusion process was changed or the vacuum suction force was too small, leading to a significant increase in bubbles, a reduction in breakdown voltage, and an impact on adhesion performance.

The comparative examples 8-9 are the cases where the preheating temperature was too high or too low, leading to a significant increase in bubbles and failure of the flexibility test.

The comparative examples 10-11 are the cases where the thickness of the intermediate layer was too large or too small. An excessively thin intermediate layer affects the adhesion, and an excessively thick intermediate layer reduces the breakdown voltage.

The comparative examples 12-13 compare the compositions of the intermediate layer mixture, and excessively high or low mass ratios of polyamide-imide to polyimide both affect the adhesion of the product.

The above are only preferred embodiments of the present disclosure and are not intended to limit the present disclosure. For those skilled in the art, various modifications and variations can be made to the present disclosure. Any modification, equivalent substitution, improvement, etc. made within the spirit and principles of the present disclosure shall be included in the scope of protection of the present disclosure.

The invention claimed is:

1. An insulated wire, comprising a conductor, with an intermediate layer and an insulating layer sequentially coated on the conductor, wherein
   the intermediate layer comprises polyamide-imide and polyimide, and a mass ratio of polyamide-imide to polyimide in the intermediate layer is (8-30): 1;
   the insulating layer comprises thermoplastic polyimide and a corona-resistant material, and a mass percentage of the corona-resistant material in the insulating layer is 6%-10%;
   the corona-resistant material is selected from at least one of titanium dioxide, silicon dioxide, and aluminum oxide;

a thickness ratio of the intermediate layer to the insulating layer is 1:(13-18); and a preparation process of the insulated wire comprises: forming the intermediate layer by multiple times of coating and curing to obtain a core material, mixing the thermoplastic polyimide and the corona-resistant material, and then melting and extruding the mixture onto an outer side of the core material to form the insulating layer; and a preparation process of the insulating layer comprises: mixing the thermoplastic polyimide and the corona-resistant material to obtain an insulating layer mixture, and then melting and extruding the insulating layer mixture under a negative pressure condition and at a temperature of 370° C.-410° C., with controlling a vacuum suction used to apply the negative pressure to be greater than or equal to 0.3 MPa; and before the melting and extruding, the core material is preheated to 200° C.-320° C.

2. The insulated wire according to claim 1, wherein when the insulating layer is stretched at a rate of 300 mm/min by 20%, a length at which the insulating layer loses adhesion is no more than 1 times a width of the conductor.

3. The insulated wire according to claim 1, wherein a corona onset voltage of the insulating layer is above 1500V, and a corona resistance time is above 200 h.

4. The insulated wire according to claim 1, wherein a particle size of the corona-resistant material is 10 nm-30 nm.

5. The insulated wire according to claim 1, wherein a thickness of the intermediate layer is 5 μm-30 μm, and a thickness of the insulating layer is 50 μm-300 μm.

6. The insulated wire according to claim 1, wherein a material of the conductor is selected from at least one of copper, copper alloy, aluminum, and aluminum alloy.

7. A preparation method of the insulated wire according to claim 1, comprising forming the intermediate layer and the insulating layer sequentially on the conductor, comprising:

forming the intermediate layer by multiple times of coating and curing to obtain the core material, mixing the thermoplastic polyimide and the corona-resistant material, and then melting and extruding the mixture onto the outer side of the core material to form the insulating layer; and the preparation process of the insulating layer comprises: mixing the thermoplastic polyimide and the corona-resistant material to obtain the insulating layer mixture, and then melting and extruding the insulating layer mixture under the negative pressure condition and at the temperature of 370° C.-410° C., with controlling the vacuum suction used to apply the negative pressure to be greater than or equal to 0.3 MPa; and before the melting and extruding, the core material is preheated to 200° C.-320° C.

8. The preparation method according to claim 7, wherein an extruder is vacuumed for 60 min to 120 min before adding the insulating layer mixture into the extruder.

9. The preparation method according to claim 8, wherein after extrusion, a temperature is maintained at 280° C.-320° C. for 12 s-20 s, then cooled.

10. The preparation method according to claim 7, wherein a preparation process of the insulating layer mixture comprises: drying the thermoplastic polyimide and the corona-resistant material separately, and then mixing them in an inert atmosphere, wherein a drying temperature is controlled to be 180° C.-220° C., and a drying time is controlled to be 4 h-6 h.

11. The preparation method according to claim 7, wherein a preparation process of the core material comprises: mixing polyamide-imide, polyimide, and an organic solvent to obtain an intermediate layer mixture, and coating and curing the intermediate layer mixture on the conductor multiple times.

12. The preparation method according to claim 11, wherein during the preparation of the intermediate layer mixture, a mass ratio of polyamide-imide to polyimide is controlled to be (8-30):1.

13. The preparation method according to claim 12, wherein an amount of the organic solvent is adjusted to make a solid content of the intermediate layer mixture be 20%-25%.

14. The preparation method according to claim 12, wherein a thickness of each time of the coating is controlled to be 2 μm-3 μm, and the number of times of coating is controlled to be 3-10.

15. The preparation method according to claim 14, wherein a curing temperature is controlled to be 250° C.-450° C. each time.

16. A coil, comprising the insulated wire according to claim 1.

17. An electronic/electrical equipment, comprising the coil according to claim 16.

* * * * *